United States Patent
Kokubu et al.

(10) Patent No.: US 11,225,217 B2
(45) Date of Patent: Jan. 18, 2022

(54) AIRBAG APPARATUS

(71) Applicant: TOYOTA JIDOSHA KABUSHIKI KAISHA, Aichi-ken (JP)

(72) Inventors: Kenji Kokubu, Toyota (JP); Masatoshi Otake, Nagakute (JP); Takeshi Miyajima, Nagakute (JP); Masayuki Tado, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/802,555

(22) Filed: Feb. 27, 2020

(65) Prior Publication Data

US 2020/0290550 A1 Sep. 17, 2020

(30) Foreign Application Priority Data

Mar. 12, 2019 (JP) .............................. JP2019-044615

(51) Int. Cl.
*B60R 21/2165* (2011.01)
*B60R 21/205* (2011.01)

(52) U.S. Cl.
CPC ........ *B60R 21/2165* (2013.01); *B60R 21/205* (2013.01)

(58) Field of Classification Search
None
See application file for complete search history.

(56) References Cited

U.S. PATENT DOCUMENTS

| 7,425,018 | B2 * | 9/2008 | Suwama | B29C 45/1671 280/728.3 |
| 7,918,481 | B2 * | 4/2011 | Ohgo | B60R 21/2165 280/728.3 |
| 9,260,074 | B2 * | 2/2016 | Fujita | B60R 21/2165 |
| 9,975,517 | B2 * | 5/2018 | Shick | B60R 21/205 |
| 2010/0164136 | A1 * | 7/2010 | Saitou | B29C 45/16 264/242 |
| 2011/0278826 | A1 | 11/2011 | Fukawatase et al. | |
| 2014/0333052 | A1 * | 11/2014 | Fujita | B60R 21/2165 280/728.3 |
| 2017/0050606 | A1 * | 2/2017 | Asakuma | B60R 21/2165 |
| 2017/0305379 | A1 | 10/2017 | Shick et al. | |
| 2018/0222430 | A1 * | 8/2018 | Totani | B32B 27/12 |
| 2021/0009066 | A1 * | 1/2021 | An | B60R 21/205 |

FOREIGN PATENT DOCUMENTS

| EP | 0487753 A1 | 6/1992 | |
| FR | 3083760 A1 * | 1/2020 | ......... B60R 21/2165 |
| JP | 20006742 A | 1/2000 | |
| JP | 2007-22336 A | 2/2007 | |
| JP | 2014-125169 A | 7/2014 | |

* cited by examiner

*Primary Examiner* — Faye M Fleming
(74) *Attorney, Agent, or Firm* — Hauptman Ham, LLP

(57) ABSTRACT

An airbag apparatus includes an airbag housed deployably, and an instrument panel covering the airbag in a deploying direction and forming a design surface of a vehicle cabin. The instrument panel includes, on the design surface facing the vehicle cabin, a character line including continuous protrusions toward the deploying direction. The instrument panel includes, on a surface facing the airbag along the character line, a tear line that ruptures at the time of deployment of the airbag.

5 Claims, 6 Drawing Sheets

AIRBAG APPARATUS

CROSS REFERENCE TO RELATED APPLICATION

This application claims priority to Japanese Patent Application No. 2019-044615 filed on Mar. 12, 2019, which is incorporated herein by reference in its entirety including the specification, claims, drawings, and abstract.

TECHNICAL FIELD

The present disclosure relates to an airbag apparatus for a vehicle, including a deployably housed airbag.

BACKGROUND

An airbag apparatus for a vehicle typically includes a panel member covering an airbag in a deploying direction, and a tear line is formed on a rear surface of the panel member. At the time of deployment of the airbag, the tear line ruptures to allow the airbag to deploy within a vehicle cabin.

JP 2007-022336 A discloses a panel member having an uneven design surface facing a vehicle cabin. The panel member includes a tear line on its rear surface and the tear line includes, at its bottom, projections corresponding to the recesses of the design surface and recesses corresponding to projections of the design surface, to thereby make the thickness of the tear line uniform.

JP 2014-125169 A discloses that a tear line on the rear surface of a panel member is more sharp and more tapered at a portion corresponding to a design groove formed on a design surface of the panel member as compared to other portions. The sharply tapered tear line, to which stress is concentrated, will rupture in a stable manner.

SUMMARY

The panel member may include a character line on its design surface which is a surface of the panel member facing a vehicle cabin. The character line refers to a linear site on a curved design surface formed by continuous portions near an apex of a projecting portion of the design surface projecting toward the vehicle cabin. The design surface has different angles at the opposite sides of the character line, so that, upon deployment of the airbag, the panel member receives contact pressure at different angles from the airbag. Therefore, when the character line diagonally traverses the tear line, for example, a force acting on the tear line may vary at different positions to make deployment of the airbag unstable.

An embodiment of the disclosure is directed toward stabilizing deployment of an airbag when a panel member includes a character line and a tear line.

In one aspect of the disclosure, an airbag apparatus includes an airbag housed deployably, and a panel member covering the airbag in a deploying direction and forming a design surface of a vehicle cabin. The panel member includes, on a surface facing the vehicle cabin, a character line including continuous protrusions toward the deploying direction. The panel member further includes, on a surface facing the airbag, along the character line, a tear line that ruptures at the time of deployment of the airbag.

In one embodiment, the character line and the tear line may be substantially aligned with each other in the deploying direction.

In one embodiment, the character line and the tear line may be spaced from each other in the deploying direction, and the airbag apparatus may further include a spacer member that controls a direction of a force to be transmitted from the airbag to the panel member, between the panel member and the airbag, at a portion closer to the character line with respect to the tear line.

In the airbag apparatus of the disclosure, which includes a panel member having a character line, rupture of the tear line in the panel member is stabilized to thereby enhance stability in deployment of the airbag.

BRIEF DESCRIPTION OF DRAWINGS

Embodiment(s) of the present disclosure will be described by reference to the following figures, wherein.

DESCRIPTION OF EMBODIMENTS

Embodiments will be described below by reference to the drawings. While in the following description, specific embodiments are described to facilitate understanding, these are only examples and various other embodiments may be adopted.

(1) Embodiment 1

Figure 1:
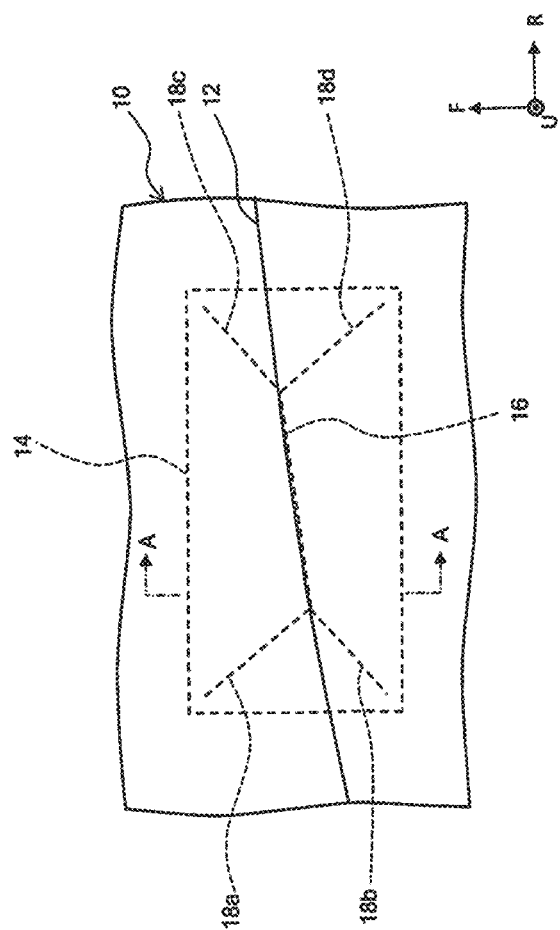
FIG. 1 is a top view of an airbag apparatus according to Embodiment 1.
Figure 2:
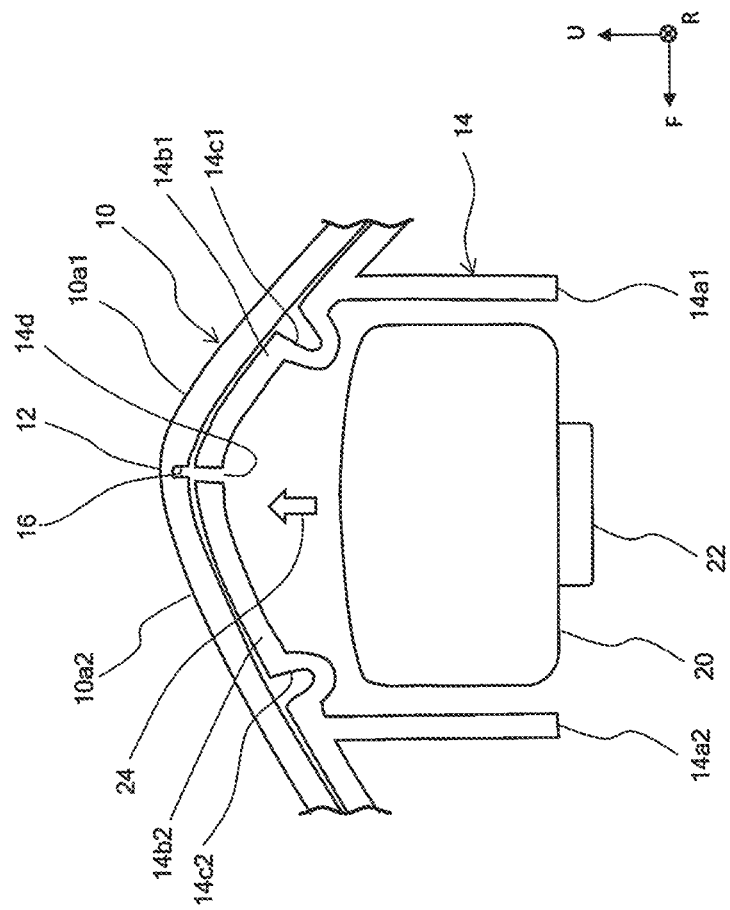
FIG. 2 is an end view schematically illustrating the airbag apparatus along plane A-A in in FIG. 1.
Figure 3:
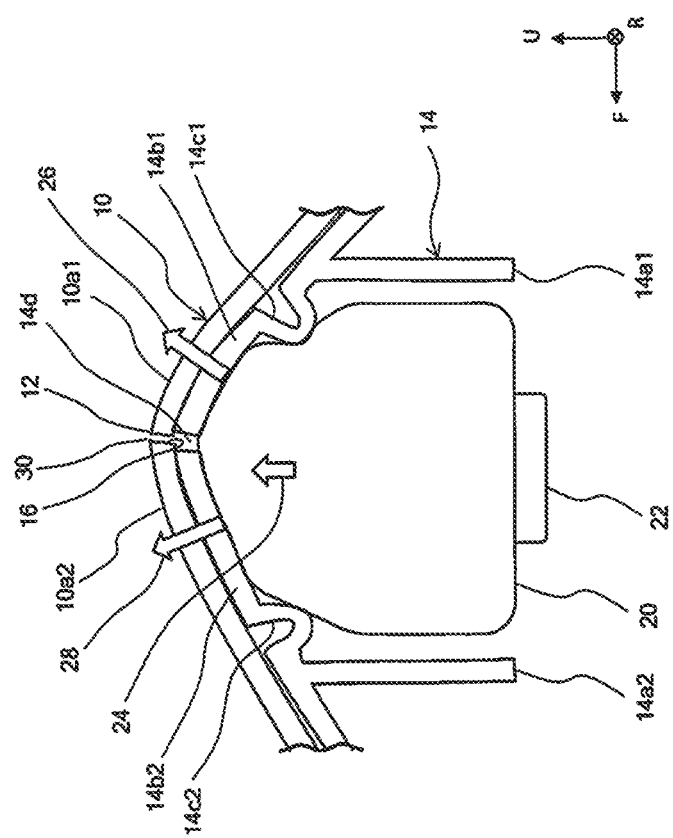
FIG. 3 is an end view schematically illustrating the airbag apparatus in the process of deployment.

Referring to FIG. 1 to FIG. 3, an airbag apparatus according to Embodiment 1 will be described. FIG. 1 illustrates part of an instrument panel 10 according to Embodiment 1 located in front of a passenger seat of a vehicle. In a coordinate system shown in FIG. 1, an F axis indicates a forward direction in the vehicle, a U axis indicates an upward direction, and an R axis indicates a rightward direction of an occupant (which similarly applies to the following drawings).

The instrument panel 10 is a resin panel member disposed in a front portion of a vehicle cabin. The instrument panel 10 includes a design surface facing the vehicle cabin, which is visually recognized by an occupant and is therefore formed in consideration of design. The instrument panel 10 includes a substrate made of comparatively hard resin. The instrument panel 10 further includes, on a surface of the substrate facing the vehicle cabin, an outer layer made of comparatively soft resin to thereby form a design surface. The outer layer may have fine patterns formed by graining to increase design quality.

In the present embodiment, the instrument panel 10 includes a character line 12. The character line 12 is formed of continuous protruding portions viewed in the deploying direction of the airbag. While the character line 12 is usually referred to as "line", the character line 12 is not limited to a straight line and may have a curved shape. Also, while the character line 12 may be recognized as a thin line, it may also be recognized as a line having a certain width.

On the back side (which is a side facing opposite the vehicle cabin) of the instrument panel 10, an airbag retainer 14 housing the airbag is disposed. The instrument panel 10 further includes, on its rear surface, a tear line 16 used to cause the instrument panel 10 to rupture at the time of deployment of the airbag. The tear line 16 is formed along the character line 12, which is a state where the tear line 16 is substantially parallel to the character line 12. More specifically, the tear line 16 is set at a position where the tear line 16 is aligned with the character line 12 when viewed in the airbag deploying direction.

On opposite ends of the tear line 16, sub tear lines 18a and 18b, and sub tear lines 18c and 18d are formed to expand the rupturing portion of the instrument panel 10. The tear line 16 is bifurcated at its left end into the sub tear lines 18a and 18b and is bifurcated at its right end into the sub tear lines 18c and 18d. While these sub tear lines 18a, 18b, 18c, and 18d are referred to "sub" tear lines because they are located around the tear line 16 formed in the center, these sub tear lines are the same as the tear line 16 concerning their structure for rupturing the instrument panel 10.

FIG. 2 is an end view schematically illustrating the airbag apparatus along plane A-A in FIG. 1. FIG. 2 illustrates the instrument panel 10, the airbag retainer 14, an airbag 20, and an inflator 22. The deploying direction 24 of the airbag 20 is indicated by an arrow. To simplify explanation, the deploying direction 24 is shown to correspond to the U-axis direction; that is, the vertically upward direction. It should be noted that FIG. 2 shows protrusions and recesses in the vertical direction exaggeratedly and is illustrated in a scale different from the actual scale.

As illustrated in FIG. 2, the instrument panel 10 is formed in a curved shape to protrude in the deploying direction 24 of the airbag 20, with the character line 12 located near the apex of this protruding portion. More specifically, the character line 12 is located near the tip end in the deploying direction 24 of the airbag 20, and the instrument panel 10 has a greater curvature at the character line 12 than in other portions. The character line 12 is located slightly rearward from the center in the plane A-A.

The instrument panel 10 includes, in a region further rearward with respect to the character line 12, a rearward-tilted surface 10a1 extending downward as it extends rearward. The instrument panel 10 further includes, in a region further frontward with respect to the character line 12, a forward-tilted surface 10a2 extending downward as it extends forward. The instrument panel 10 includes the tear line 16 on the back of the character line 12. The tear line 16 is a groove-like portion formed on the back surface of the instrument panel 10. The instrument panel 10 has a small thickness at the tear line 16; therefore, the tear line 16 is a brittle part which would rupture more easily than other regions of the instrument panel 10.

The airbag retainer 14 is a resin member attached on the rear surface of the instrument panel 10. The airbag retainer 14 includes side walls 14a1 and 14a2 (which may be collectively referred to as a side wall 14a) and upper walls 14b1 and 14b2 (which may be collectively referred to as an upper wall 14b). The side wall 14a1 is disposed on a side face rearward of the airbag 20, and the side wall 14a2 is disposed on a side face frontward of the airbag 20. As can be understood from the rectangular shape of the airbag retainer 14 indicated by a dotted line in FIG. 1, the side walls 14a overall enclose four side faces of the airbag.

The upper walls 14b are wall faces disposed frontward in the deploying direction 24 of the airbag. The upper wall 14b1 is disposed on the back of the rearward-tilted surface 10a1 of the instrument panel 10 and is tilted rearward at an angle similar to the angle of the rearward-tilted surface 10a1. While FIG. 2 shows a small space between the upper wall 14b1 and the rearward-tilted surface 10a1 which are disposed in a closely adjacent state, the upper wall 14b1 and the rearward-tilted surface 10a1 may be disposed in contact with each other. The upper wall 14b1 is connected with the side wall 14a1, and includes a hinge portion 14c1 formed to protrude downward in a region of the upper wall 14b1 near the side wall 14a1. The hinge portion 14c1 is bent to allow the upper wall 14b1 to open smoothly at the time of deployment of the airbag 20.

The upper wall 14b2 is disposed on the back of the forward-tilted surface 10a2 and is tilted forward at an angle similar to that of the forward-tilted surface 10a2. The upper wall 14b2 is connected with the side wall 14a2, and includes a hinge portion 14c2. A space 14d is formed between the upper walls 14b1 and 14b2, so that the upper walls 14b1 and 14b2 are separated from each other. The space 14d is aligned with the tear line 16 when viewed in the deploying direction 24 of the airbag 20.

FIG. 2 shows the airbag 20 which is folded and housed within the airbag retainer 14. The airbag 20 is covered with the upper walls 14b of the airbag retainer 14 and the instrument panel 10 in the deploying direction. The inflator 22 is disposed under the airbag 20 to inject high pressure gas into the airbag 20.

Referring now to FIG. 3, the airbag at the time of deployment will be described. FIG. 3 corresponds to FIG. 2, and schematically illustrates a state of the airbag 20 immediately after deployment.

When a collision of the vehicle is detected by a sensor, the inflator 22 is actuated to supply high pressure gas into the airbag 20 in the deploying direction 24. As illustrated in FIG. 3, the airbag 20 rapidly inflates in the deploying direction so that the expanding front face of the airbag 20 especially presses the upper walls 14b1 and 14b2 of the airbag retainer 14 toward the deploying direction.

The upper wall 14b1 is connected with the side wall 14a1. Of the force exerted to the upper wall 14b1 from the airbag 20, the force acting in the direction parallel to the wall surface of the upper wall 14b1 is cancelled by a reaction working within the upper wall 14b1. The upper wall 14b1 therefore would not substantially move in the direction parallel to its wall surface. Meanwhile, of the force exerted to the upper wall 14b1 from the airbag 20, a pressing force 26 acting vertically on the wall surface of the upper wall 14b1 which is indicated by an arrow in FIG. 3 would not be substantially affected by a reaction. The upper wall 14b1 would therefore easily move in the direction of the pressing force 26 about the hinge portion 14c1 serving as a rotation axis, to strongly press the rear surface of the rearward-tilted surface 10a1 of the instrument panel 10. Similarly, a pressing force 28 acting vertically on the wall surface of the upper wall 14b2 that is generated by contact pressure of the airbag 20 would urge the upper wall 14b2 in the direction of the pressing force 28 against the rear surface of the forward-tilted surface 10a2.

The character line 12 and the tear line 16 of the instrument panel 10 are disposed in alignment with the space 14d of the airbag retainer 14. This structure causes the pressing force 26 to act on the rearward-tilted surface 10a1 of the instrument panel 10 through the upper wall 14b1 of the airbag retainer 14 and causes the pressing force 28 to act on the forward-tilted surface 10a2 through the upper wall 14b2. More specifically, the upward and rearward pressing force 26 acts on a region of the instrument panel 10 further rearward with respect to the character line 12, while the upward and forward pressing force 28 acts on a region of the instrument panel 10 further frontward with respect to the character line 12. Therefore, the region of the instrument panel 10 near the character line 12 is expanded upward and is also pulled forward and rearward. As the character line 12 is made brittle due to the tear line 16 formed on the back, the instrument panel 10 would easily rupture at the tear line 16 to form a rupturing region 30. FIG. 3 illustrates a state of the instrument panel 10 immediately after rupture, where the instrument panel 10 is split into the rearward-tilted surface 10a1 in the direction of the pressing force 26 and the forward-tilted surface 10a2 in the direction of the pressing force 28.

As described above, at the time of deployment of the airbag 20, a force that pulls the character line 12 of the instrument panel 10 from its opposite sides is exerted to the character line 12. In Embodiment 1, the tear line 16, which is formed at a position on the instrument panel 10 aligned with the character line 12 when viewed in the deploying direction 24, allows the instrument panel 10 to stably rupture at the tear line 16.

In the above description, the direction of the character line 12 (which is formed at a slight angle to the vehicle width direction) and the direction of the airbag retainer 14 (which is substantially parallel to the vehicle width direction) are different, as illustrated in FIG. 1, to facilitate securing of a space where the airbag retainer 14 is placed. However, the direction in which the airbag retainer 14 is disposed may correspond to the direction of the character line 12.

Further, while the deploying direction 24 of the airbag 20 is set to the upward direction, as illustrated in FIG. 2, the deploying direction 24 may be directed further toward the occupant by rotating the instrument panel 10 and the like clockwise in FIG. 2. In this case, deployment of the airbag 20 may be similarly stabilized by setting the character line 12 at an apex of the protrusion in the deploying direction 24.

Also, while the upper wall 14b of the airbag retainer 14 is disposed on the back of the instrument panel 10, Embodiment 1 may be applied to a structure without the upper wall 14b.

(2) Embodiment 2

Figure 4:
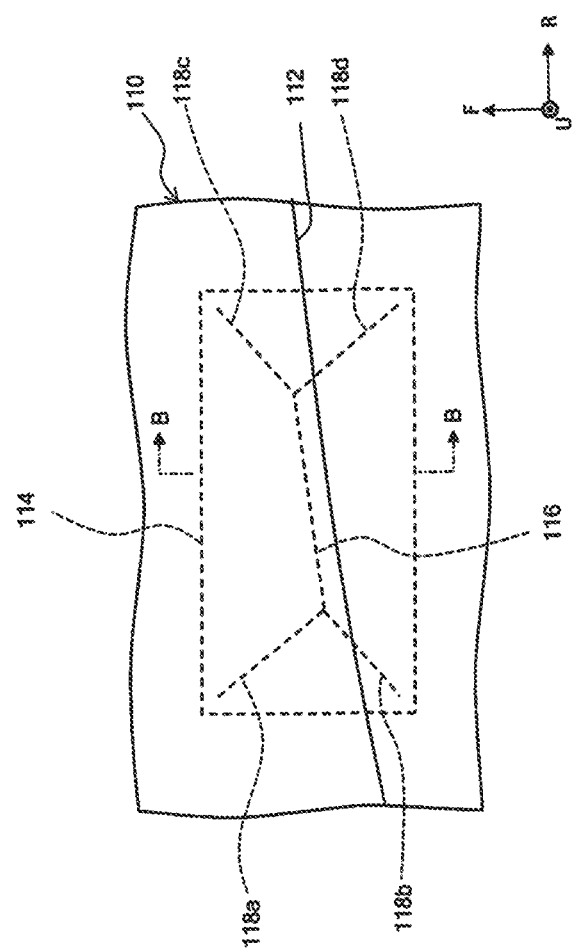
FIG. 4 is a top view of an airbag apparatus according to Embodiment 2.
Figure 5:
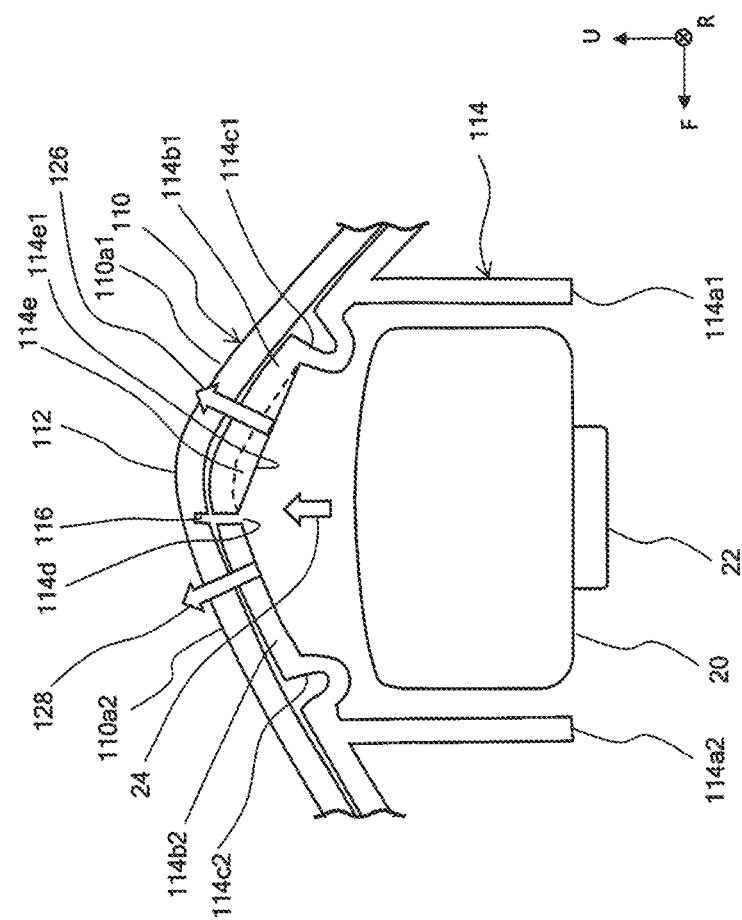
FIG. 5 is an end view schematically illustrating the airbag apparatus along plane B-B in in FIG. 4.
Figure 6:
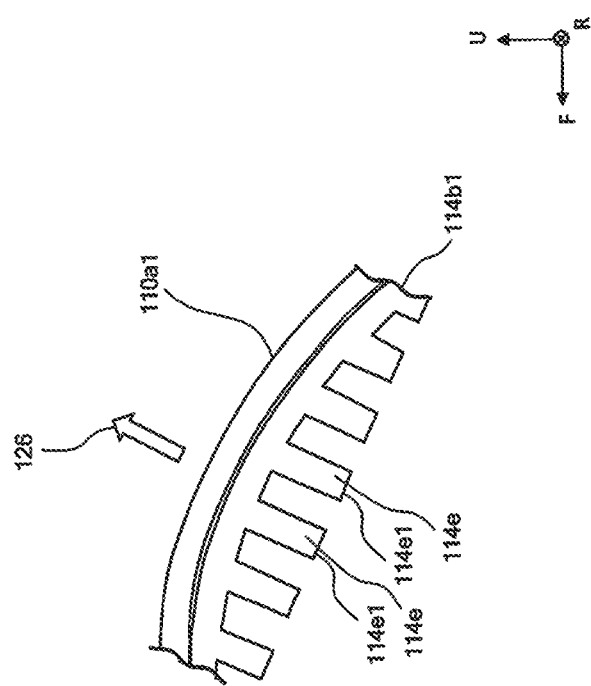
FIG. 6 is a diagram for explaining a rib serving as a spacer member.

Referring to FIG. 4 to FIG. 6, an airbag apparatus according to Embodiment 2 will be described. FIG. 4 and FIG. 5 correspond to FIG. 1 and FIG. 2, respectively.

As illustrated in FIG. 4, the position of a character line 112 formed on an instrument panel 110 according to Embodiment 2 is translated rearward from the position of the character line 12 formed on the instrument panel 10 according to Embodiment 1. As such, the instrument panel 110 has a three-dimensional shape that is different from that of the instrument panel 10 according to Embodiment 1. While, in Embodiment 2, an airbag retainer 114, a tear line 116, and sub tear lines 118a, 118b, 118c, and 118d differ from those in Embodiment 1 in their three-dimensional shapes, they are shown in the top view of FIG. 4 at positions substantially similar to those in Embodiment 1. In Embodiment 2, the tear line 116, which is disposed along the character line 112, is not aligned with the character line 112 when viewed in the deploying direction 24.

FIG. 5 is an end view schematically illustrating the airbag apparatus 110 along a plane B-B in FIG. 4. The position of the plane B-B differs from the position of the plane A-A in FIG. 1 along the vehicle width direction, so as to make the position of the character line 112 in the end view of FIG. 5 substantially correspond to the position of the character line 12 in the end view in FIG. 2 for ease of comparison.

As illustrated in FIG. 5, the instrument panel 110 in this end view has substantially the same shape as the instrument panel 10 in FIG. 2. Specifically, the instrument panel 110 includes the character line 112 slightly rearward from the center, and includes a rearward-tilted surface 110a1 and a forward-tilted surface 110a2 at the back and in front of the character line 112, respectively.

The instrument panel 110 includes the tear line 116 on its rear surface near the center of the instrument panel 110. As described above, in Embodiment 2, unlike Embodiment 1, the tear line 116 is not aligned with the character line 112 in the deploying direction 24.

The airbag retainer 114 includes side walls 114a1 and 114a2 and upper walls 114b1 and 114b2. The upper walls 114b1 and 114b2 include hinge portions 114c1 and 114c2, respectively. A space 114d is formed between the upper walls 114b1 and 114b2 in substantially the same manner as in Embodiment 1. In Embodiment 2, however, the space 114d is aligned with the tear line 116 of the instrument panel 110 when viewed from the deploying direction 24. Thus, the space 114d, which is formed along the character line 112, is not aligned with the character line 112 when viewed in the deploying direction 24.

A plurality of ribs 114e which are example spacer members are disposed on the back side (a side facing the airbag 20) of the upper wall 114b1, between the hinge portion 114c1 and the space 114d, such that tip ends 114e1 of these ribs 114e are substantially level with each other. The spacer member reduces complexity of a shape associated with the character line 112 and controls the direction of the contact pressure from the airbag 20.

FIG. 6 schematically illustrates part of the rib 114e. Specifically, FIG. 6 illustrates the rearward-tilted surface 110a1 of the instrument panel 110, the upper wall 114b1 of the airbag retainer 114, and a plurality of ribs 114e. The ribs 114e extend diagonally downward and forward from the upper wall 114b1 along a direction of a pressing force 126, as will be described below. The tip ends 114e1 of the ribs 114e have a length such that the tip ends 114e1 are located on the same plane which is set to be perpendicular to the direction of the pressing force 126. Each rib 114e is integrally molded with the airbag retainer 114 by a resin. The ribs 114e, when employed as the spacer member, are hardened faster than a dense resin and facilitate integral molding.

The airbag 20 according to Embodiment 2 at the time of deployment will be described. Upon starting deployment, the airbag 20 extends in the deploying direction 24 and the portion of the airbag 20 further rearward with respect to the center portion presses the tip ends 114e1 of the ribs 114e of the airbag retainer 114. As described above concerning Embodiment 1, a force of the tip ends 114e1 acting in the in-plane direction is cancelled by a reaction within the airbag retainer 114 and would not contribute to the movement of the airbag retainer 114. However, the pressing force 126 acting in the direction perpendicular to the plane of the tip ends 114e1 would move the upper wall 114b1 in the direction of the pressing force 126 to further move the instrument panel 110 above the upper wall 114b1 in the direction of the pressing force 126. The instrument panel 110 includes a whole of the rearward-tilted surface 110a1, the character line 112, and part of the forward-tilted surface 110a2, with different tilts, in the range where the pressing force 126 is exerted. However, the ribs 114e, when receiving the pressing force 126 from the airbag 20, control the direction of the pressing force 126 to be aligned. This allows the pressing force 126 for rupture to be stably transmitted to the instrument panel 110 in a potion further rearward from the tear line 116.

The airbag 20, in a portion further frontward with respect to the center portion, presses the rear surface of the upper wall 114*b*2 of the airbag retainer 114. The upper wall 114*b*2, contrary to the upper wall 114*b*1, is entirely formed at substantially the same angle so that the direction of the pressing force 128 is stably determined. This allows the pressing force 128 to be stably transmitted to the instrument panel 110 which is located above the tear line 116 in a portion further frontward from tear line 116.

A tensile force is thus applied to the instrument panel 110 from opposite sides of the tear line 116 to allow the tear line 116 to stably rupture. This further stabilizes deployment of the airbag 20.

The tear line 116 is typically formed near the center of the airbag 20 (airbag retainer 114). In Embodiment 2, however, it is not necessary to align the character line 112 with the tear line 116 in the deploying direction 24. This increases the degree of freedom of design concerning the position where the tear line 116 (and also the airbag 20) is disposed, or concerning the position where the character line 112 is disposed.

In the above description, a plurality of ribs 114*e* are used as a spacer member to control the pressing force 126. Here, the rib 114*e*, which is formed to have strength to inhibit deformation by the pressing force 126, may be an independent protrusion which is not coupled with adjacent ribs 114*e*. Alternatively, the rib 114*e* may be coupled with adjacent ribs 114*e* to secure the strength. Further, the ribs 114*e* may be replaced with any spacer members having other shapes, which have strength to resist the pressing force 126, such as, for example, a spacer member having no space therein and made of a dense resin. The rib 114*e* or the alternative spacer member may be integrally molded with the airbag retainer 114 or may be molded separately and then joined to the airbag retainer 114. When the upper wall 114*b* of the airbag retainer 114 is not disposed on the back of the instrument panel 110, the instrument panel 110 may include a spacer member such as the rib 114*e*, for example.

In the above example, the tip ends 114*e*1 of the ribs 114*e* serving as the spacer members are disposed on substantially the same plane. However, the surface against which the spacer member is pressed by the airbag 20 is not limited to a plane, and may be a curved face having a curvature which is sufficient to align the direction of the pressing force 126 to be transmitted. The spacer member need not be disposed over the whole rear surface of the upper wall 114*b*1, and may be formed on only part of the rear surface of the upper wall 114*b*1. For example, the spacer member may be disposed only in a region at the back of the region from the tear line 116 to the character line 112.

The invention claimed is:

1. An airbag apparatus, comprising:
an airbag housed deployably; and
a panel member covering the airbag in a deploying direction and forming a design surface of a vehicle cabin, wherein
the panel member includes, on a surface facing the vehicle cabin, a character line including continuous protrusions toward the deploying direction,
the panel member includes, on a surface facing the airbag, along the character line, a tear line that ruptures at the time of deployment of the airbag,
the character line and the tear line are spaced from each other in the deploying direction,
the airbag apparatus further comprises a spacer member that controls a direction of a force to be transmitted from the airbag to the panel member, between the panel member and the airbag, in a portion closer to the character line with respect to the tear line, and
the spacer member has a plurality of ribs which face the airbag at the time of deployment of the airbag.

2. The airbag apparatus according to claim 1, wherein the character line and the tear line are substantially aligned with each other in the deploying direction.

3. The airbag apparatus according to claim 1, wherein the spacer is disposed behind the character line.

4. The airbag apparatus according to claim 1, wherein tips of the plurality of ribs are on a plane.

5. The airbag apparatus according to claim 1, wherein the plurality of ribs extends in a direction orthogonal to the tear line.

* * * * *